(12) United States Patent
Beigi et al.

(10) Patent No.: US 6,363,056 B1
(45) Date of Patent: Mar. 26, 2002

(54) LOW OVERHEAD CONTINUOUS MONITORING OF NETWORK PERFORMANCE

(75) Inventors: Mandis Sadr Mohammad Beigi, Tarrytown; Raymond Byars Jennings, Ossining; Dinesh Chandra Verma, Millwood, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,438

(22) Filed: Jul. 15, 1998

(51) Int. Cl.[7] ......................... H04L 12/28; H04L 12/56
(52) U.S. Cl. ...................................... 370/252; 709/224
(58) Field of Search ................................. 370/241, 242, 370/243, 244, 245, 252, 253, 401, 400; 709/224, 235, 223

(56) References Cited

U.S. PATENT DOCUMENTS

| | | | | |
|---|---|---|---|---|
| 5,886,643 A | * | 3/2000 | Diebboll et al. | 340/825.08 |
| 6,058,102 A | * | 5/2000 | Drysdale et al. | 370/252 |
| 6,108,782 A | * | 8/2000 | Fletcher et al. | 713/153 |

* cited by examiner

*Primary Examiner*—Ricky Ngo
(74) *Attorney, Agent, or Firm*—Louis P Herzberg

(57) ABSTRACT

A method, apparatus, article of manufacture and computer product for low-overhead continuous monitoring of network performance in an intranet or Internet topology. Probe packets are sent from ingress access routers where they are received and processed by egress access routers. Probe packets are generated by copying every Nth packet being sent by an ingress access router. In the event an access router does not receive the probe packet, the probe packet is discarded through normal network delivery mechanisms. Network delay is determined by subtracting the time that a probe packet was received with the time stamp enclosed in the probe packet. Round trip time is established by reflecting the probe packet back to the originating access router and computing the round trip time. Bandwidth monitoring is achieved by using the number of probe packets received to estimate the expected amount of network traffic to be received. Fault monitoring is accomplished by comparing the number of probe packets received with the number of actual packets received. When the low overhead mechanisms indicate that network delays or faults exist, a heavy weight monitoring protocol is started between two access routers in question.

70 Claims, 12 Drawing Sheets

LOW OVERHEAD CONTINUOUS MONITORING OF NETWORK PERFORMANCE

FIELD OF THE INVENTION

The present invention is directed to the field of computer networks. It is more specifically directed to monitoring network performance metrics.

BACKGROUND OF THE INVENTION

There is a growing demand for communication via networks. This is especially so, for networks that are based on the TCP/IP protocol. This is both within the context of a corporate intranet as well as the context of an ISP providing Internet services to a group of users. A typical network provider may connect different campus networks belonging to a customer via its backbone network. As a provider of network services, the provider is interested in monitoring and ensuring that the network performs according to the guidelines and limits specified in the service level agreement between itself and the customer. The need for monitoring may be felt by the network operator, the customer or both.

The network operator is typically interested in monitoring the performance of the network, which is in its domain of control. Thus, he would like to measure the performance between all the access points that a customer uses to connect to his network. One way to measure the performance would be to execute a traditional performance measurement tool on a pair of access points.

Current performance monitoring techniques involve the use of 'ping', 'traceroute', 'netperf', data accessed through SNMP, etc. These methods are disadvantageous in that they add extra traffic load in the network between all of the access points. These methods also add additional packet processing on the network routers. These traditional network performance measurement mechanisms tend to be relatively heavy weight and generally rely on sending a continuous sequence of ping packets or other network probes between an end-point to all the other end-points. This process creates a large increased load on the network. The traditional normally high overhead network performance measurement mechanisms are herein referred to as 'heavy weight' mechanisms.

A typical ISP or a corporate intranet backbone has a very large number of network end-points. It is not typical to have a continuous monitoring of network performance between all of the end-points. The problem is compounded by the fact that the access points that may be controlled by the network operator are usually intermediate points in the network, and do not constitute either the source or destination of the traffic.

Consider a network operator with N access points provided to a customer. These access points are intermediaries along the path that a packet takes from the customer network. Performance monitoring of the network operation requires monitoring the N×(N−1) simplex channels between the pair-wise access points, and determining performance metrics such as delay between these access points. Another useful metric is the determination of the bandwidth that is being used between the different access points. The bandwidth usage is often a component in the price charged to the customer by the operator.

The measurement of bandwidth between the access points is difficult to do for an ISP. An IP packet only contains the final source and destination addresses, and standard routing information only provides the next outgoing interface from an ingress access router. Thus, determining the egress access router of a packet requires building a duplicate overlay routing infrastructure within the ingress access router. This introduces additional processing delays in the forwarding of an IP packet, and also requires additional space for storage of overlay routing information.

A different issue arises when performance metrics (e.g. delays) are being monitored between the access points. An ISP would like to proactively monitor the delays between two access points belonging to a customer to verify if the delays exceed the desired bounds. Using heavy weight probes to do this monitoring across all access points is not a viable solution due to the additional load generated on the network. However, a continuous monitoring of network performance is desirable to determine the level of service provided and/or to determine if there are any problems between two network access points.

SUMMARY OF THE INVENTION

It is therefore an aspect of the present invention to provide a low overhead method for monitoring bandwidth in a corporate intranet or an ISP controlled portion of the Internet.

It is also an aspect of the invention to provide a low overhead method for performance monitoring in a corporate intranet or an ISP controlled portion of the Internet.

It is a further aspect of the invention to provide a low overhead method for fault monitoring in a corporate intranet or an ISP controlled portion of the Internet.

It is a further aspect of the invention to provide apparatus, a computer product and an article of manufacture comprising a computer usable medium having computer readable program code means embodied therein for causing a computer to perform a low overhead method for a network which includes originating and receiving access routers. The method is such that bandwidth monitoring, performance monitoring and fault monitoring are all possible. In an example implementation of the invention, network probe packets are generated by copying normal outbound packets and modifying these packets such that the destination address remains in tact. Recipient nodes can identify probe packets by their protocol number and UDP header pattern. Probe packets that are sent to nodes that are not aware of the probe packet format, discard these packets through normal network mechanisms.

Still a further aspect of the present invention is an apparatus to monitor network performance characteristic between a first and a second access point in the network. The apparatus including: a trigger mechanism at the first access point for determining a time to generate a probe packet; a probe generation mechanism at the first access point for generating a probe packet based on contents of a data packet and probe generating criteria; a probe detection mechanism at the second access point for detecting the probe packet; and an analysis mechanism to compare the probe packet detected at the second access point to the probe packet generated at the first access point.

In an embodiment of the apparatus the trigger mechanism and probe generation mechanism are located in a path of forwarding packets and/or wherein the probe detection mechanism is located in the path of forwarding packets, and/or the probe detection mechanism performs the additional function of removing probe packets from a data stream, and/or the trigger mechanism and probe generation mechanism are located outside of the data forwarding path of the packets, and monitor the flow of packets through the first access point, and/or the probe detection mechanism is located outside of the data forwarding path of packets, and operates by monitoring the flow of packets through the second access point.

Still a further aspect of the present invention is a method for providing bandwidth measurement between an ingress and an egress access router in a network. The method including the steps of: counting a plurality of packets at the ingress access-router; generating a probe packet whenever a packet count reaches a specified value N; and counting the probe packets received at the egress access-router.

In a particular embodiment of the method the step of discarding the probe packets through normal network mechanisms if an egress edge device is not found at a specified destination address of the probe packet, and/or the step of generating includes probe packets copying every Nth packet and changing the source address of the Nth packet to that of an originating access router; changing the protocol number to a reserved protocol number, attaching a UDP header with a reserved pattern, and attaching a data segment as the UDP payload which includes a probe number and a local time-stamp, and/or the step of the egress access-router identifying probe packets by the reserved protocol number and the UDP header pattern, and/or a delay between two endpoints can be determined through use of a common clock and probe packets, and/or the step of counting a first number of probe packets received, and comparing the first number to a second number of packets that should have been received.

Still a further aspect of the present invention is a method for providing bandwidth accounting between a first and a second ISP access point in a network. The method including: configuring at least one ingress access point to have a first packet count of 'N-in'; the at least one ingress access point keeping track of a second packet count 'N-out' of packets sent into the network; and generating a probe packet whenever 'N-out'='N-in', wherein the probe packets being given a destination address of an Nth packet sent into the network, and being given a source address of an ingress router associated with the at least one ingress point.

Still a further aspect of the present invention is a method for measuring network characteristics between a first and a second router in a network. The method including the steps of: configuring at least one ingress access point on the first router to generate a plurality of probe packets; generating each of the probe packets based on the contents of a next data packet passing through the ingress access point; configuring at least one egress access point on the second router to detect the probe packet; and correlating each of the probe packets received at the egress access point with each of the probe packets sent by the ingress access point to determine the network characteristics between the ingress and egress access points. In some cases the probe packets are generated after a preset number of data packets have passed through the ingress access point.

Still a further aspect of the present invention is to provide an article of manufacture comprising a computer usable medium having computer readable program code means embodied therein for determining network characteristics between a first and a second access point in a network. The computer readable program code means in the article of manufacture comprising computer readable program code means for causing a computer to effect the steps of: configuring the first access point as an ingress access point to generate a plurality of probe packets; generating each of the probe packets based on contents of a data packet and preset criteria; configuring the second access point as an egress access point to detect the probe packets; and correlating each of the probe packets received at the egress access point with one of the probe packets sent by the ingress access point to determine the network characteristics between the two access points. In some cases the network characteristics include a round-trip delay between two endpoints and the step of generating includes marking the probe packet with a time of generation, and the computer readable program code means in the article of manufacture further comprising computer readable program code means for causing a computer to effect the steps of the egress access point reflecting a probe packet back to the ingress access point; and the ingress access point comparing the time of generation to a time when the probe was received back.

Still a further aspect of the present invention is to provide a computer program product comprising a computer usable medium having computer readable program code means embodied therein for forming a plurality of probes packets in an network. The computer readable program code means in the computer program product comprising computer readable program code means for causing a computer to effect: marking a protocol field in an header of each probe packet with a reserved protocol number; filling a source port field in a UDP header for each probe packet with the reserved pattern; and filling a destination probe field with the probe number.

In a particular embodiment of the computer program product, the computer readable program code means in the computer program product further comprising the step of using the reserved protocol number at an egress access router to identify each probe packet, and/or the computer readable program code means in the computer program product further comprising the step of extracting each probe packet based on an identification obtained in the step of using.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
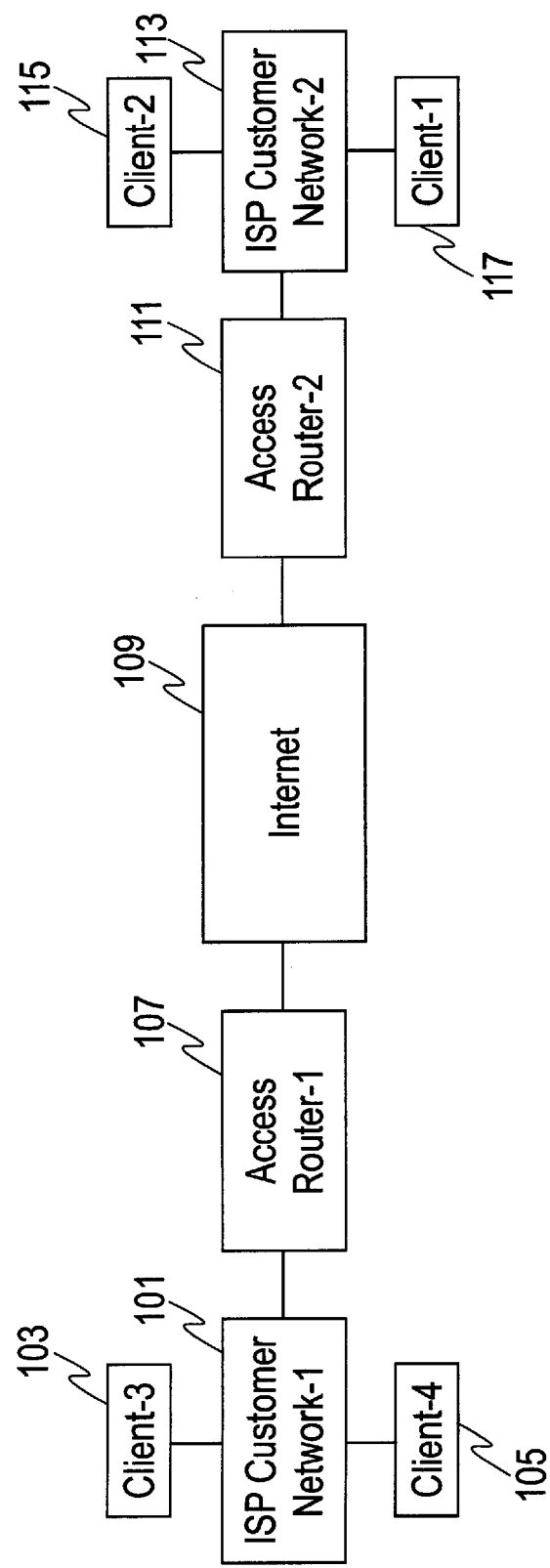
FIG. 1 shows an example block diagram of two Internet service providers (ISP) and their respective customer networks in which each ISP network has one access router connecting the network to the Internet backbone.

The network context within which this invention applies is shown in FIG. 1. It shows two ISP customer networks 101 and 113, that are connected to the Internet 109. Connectivity to the Internet 109 is obtained via the access router-1 107 and access router-2 111. Both access routers 107 and 111 serve as gateways to the ISP customer networks 101 113, and interface these networks with the Internet 109. When network traffic flows from the clients 103 and 105 on ISP customer network-1 101 to the clients 115 and 117 on ISP customer network-2 113, the traffic goes through these access routers making access router-1 107 an ingress node and access router-2 111 an egress node. An access router can alternately serve as both an ingress node and an egress node depending on the direction of the flow of the traffic. FIG. 1 also shows clients on the two ISP customer networks 107 and ill, which communicate with each other. Clients 103 and 105 are connected to ISP customer network-1 101, and may communicate with clients 115 and 117 that are connected to the ISP customer network-2 113. A similar context arises in a corporate intranet, wherein the Internet 109 is replaced by the corporate network instead of the Internet. Other applications would operate in a similar fashion. This includes, for instance, implementing this invention where one of the access points is at an entity firewall.

Within this context, one needs to monitor the bandwidth, delay and loss characteristics of a network between two access points. This needs a bandwidth monitoring protocol which determines the amount of bandwidth used between a pair of access points. For example, a bandwidth monitoring protocol may work as follows. Each ingress access point is configured with a specific count number (say N). This count can be a count of packets sent, bytes sent or time elapsed. The count is incremented based on preset criteria. The preset criteria is usually the occurrence of a type of event. The event may be a number of packets being sent, a number of bytes being sent, time elapse, and/or a dynamically changing event. The ingress access point keeps track of the count as it sends packets into the network. After every N events, it generates a new probe packet into the network. The probe packet is given the same destination (e.g. IP) address as the Nth packet into the network, but it is given a source (e.g. IP) address that is of the ingress access router. The probe packet contains special data that identifies it as a probe packet in the network. Additional data in the probe packet can be used for network monitoring.

At the egress router, the probe packets are identified and removed from the network data stream. They are sent to a local process, which analyzes the information contained in the probe packet. For bandwidth accounting, the receiving process needs to simply increment the count of packets received from the ingress access router. At periodic intervals, the accumulated number of packets received from each ingress access routers is converted into an estimate of the total number of packets being sent from that access router.

Figure 2:
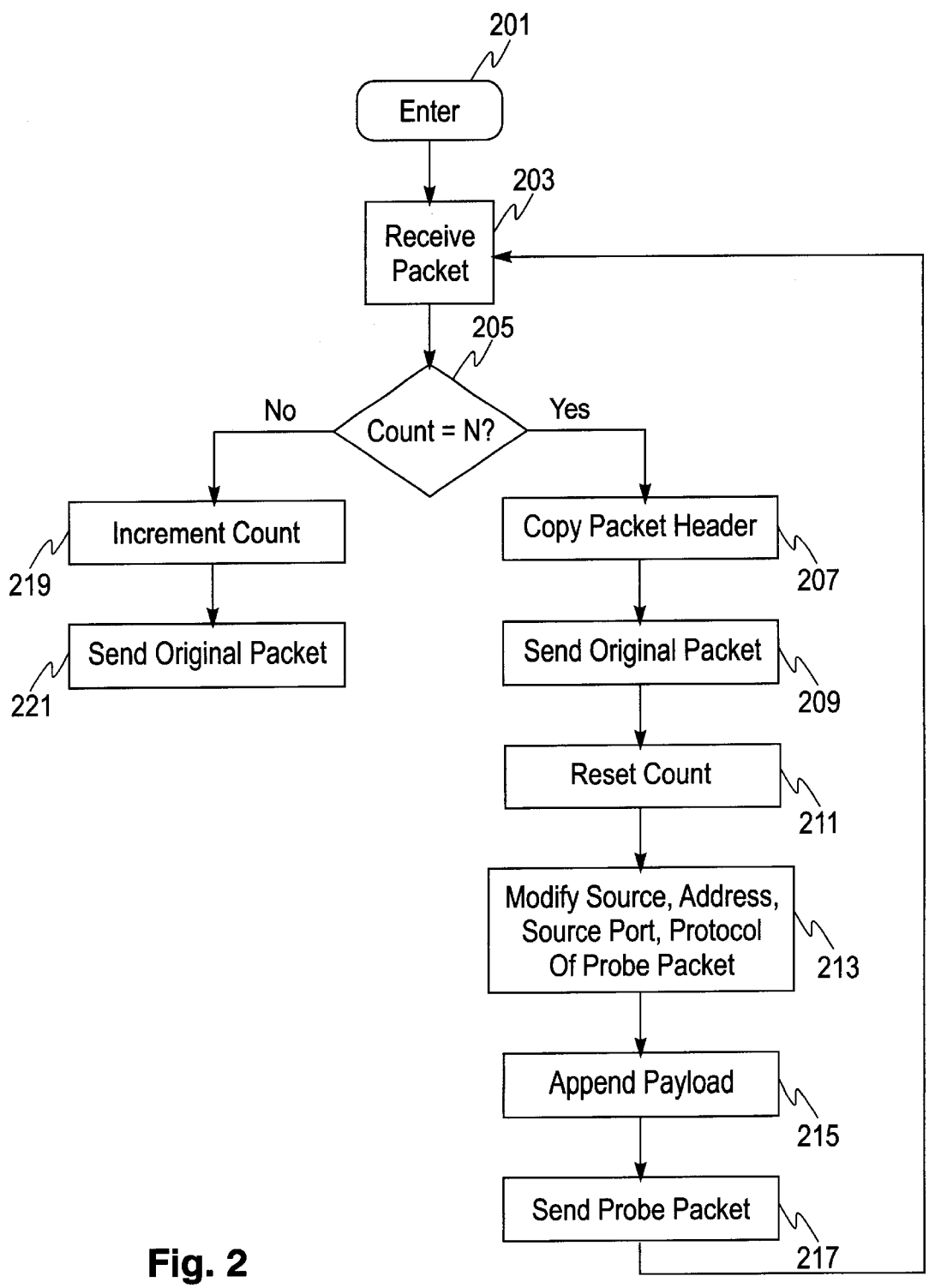
FIG. 2 shows an example flow diagram that illustrates steps taken when sending a probe packet by an access router for determining bandwidth statistics in accordance with the present invention.
Figure 3:
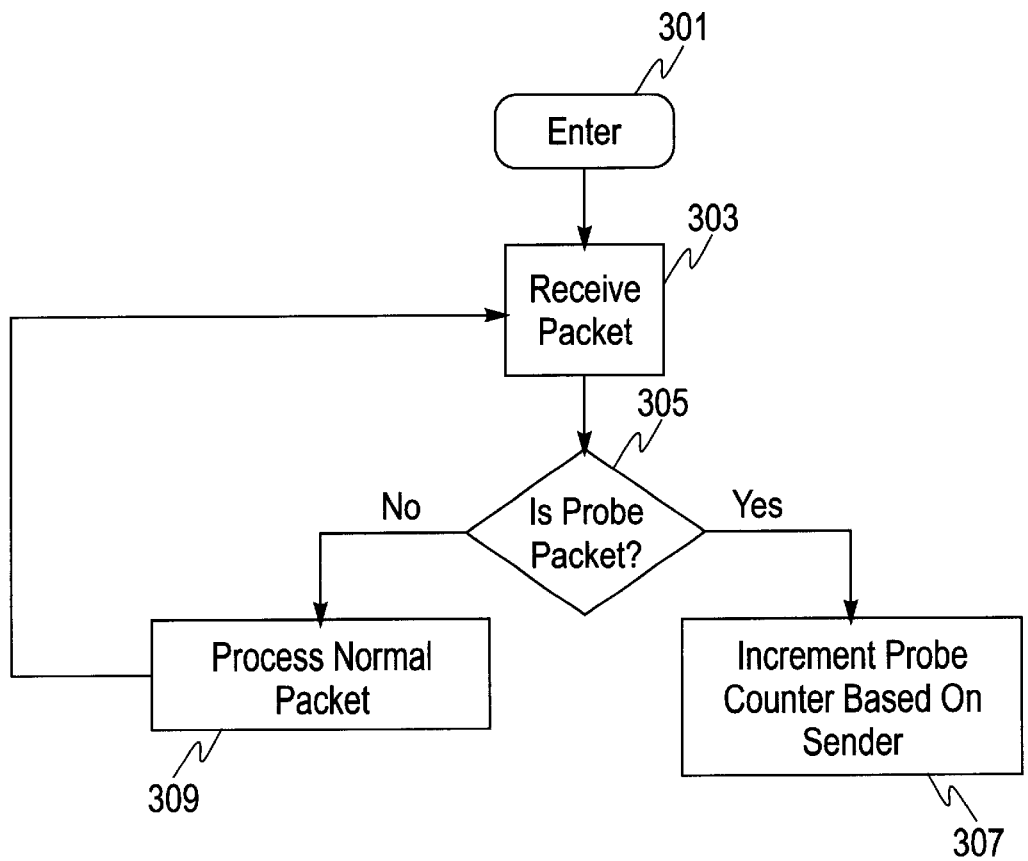
FIG. 3 shows an example flow diagram that illustrates steps taken when receiving a probe packet by an access router for bandwidth monitoring in accordance with the present invention.

Examples of the detailed steps of a bandwidth monitoring protocol are shown in FIGS. 2 and 3. Referring to FIGS. 1 and 2, the steps shown in FIG. 2 are executed by an ingress access router whenever it obtains a packet from its associated ISP network. For example, it will be executed by software running on access router-1 107 whenever that router receives a packet from the clients on ISP customer network-1 101 as shown in FIG. 1.

FIG. 2 shows an example flow diagram for the creation and transmission of probe packets for bandwidth monitoring. When a packet is received from a client by an ingress access router 203, the event count is checked 205. The event count can be based on the number of packets sent, the number of bytes sent, or the duration of time elapsed. If the event count is equal to N, where N is some preconfigured value, the header of the current packet is copied 207 and the original packet is processed and sent 209 through normal network operations. The count is reset to zero 211. A probe packet is then created 213 with the payload appended 215 to the copied packet header. The probe packet has the same packet header as the copied packet except that the source address is changed to the address of the ingress access router. In addition, the source port is changed to a defined number and the protocol number is changed to a defined number that is not already used by other protocols. The time of the creation of the probe packet is appended in the payload of the probe packet along with some other necessary data. The probe packet is then sent out 217 into the Internet (numbered as 109 in FIG. 1) to be reached by the final destination. On the other hand, if the event count is not equal to N, the counter is incremented by one 219 and the original packet is processed through normal network operations 221.

An example of reception of the probe packets by the egress access routers can be seen in the flow diagram shown in FIG. 3. When a packet is received 303 from the Internet 109 by an egress access router, the protocol field, and/or the UDP source and destination ports (which are formed to contain a special pattern described subsequently) are checked to determine if the packet is a probe packet 305. If it is not a probe packet, the normal processing of the packet is performed 309. If it is indeed a probe packet, statistics are collected 307. This includes data such as incrementing a count of the probe packets received from a certain ingress access point in order to calculate the bandwidth between the two access points.

Figure 4:
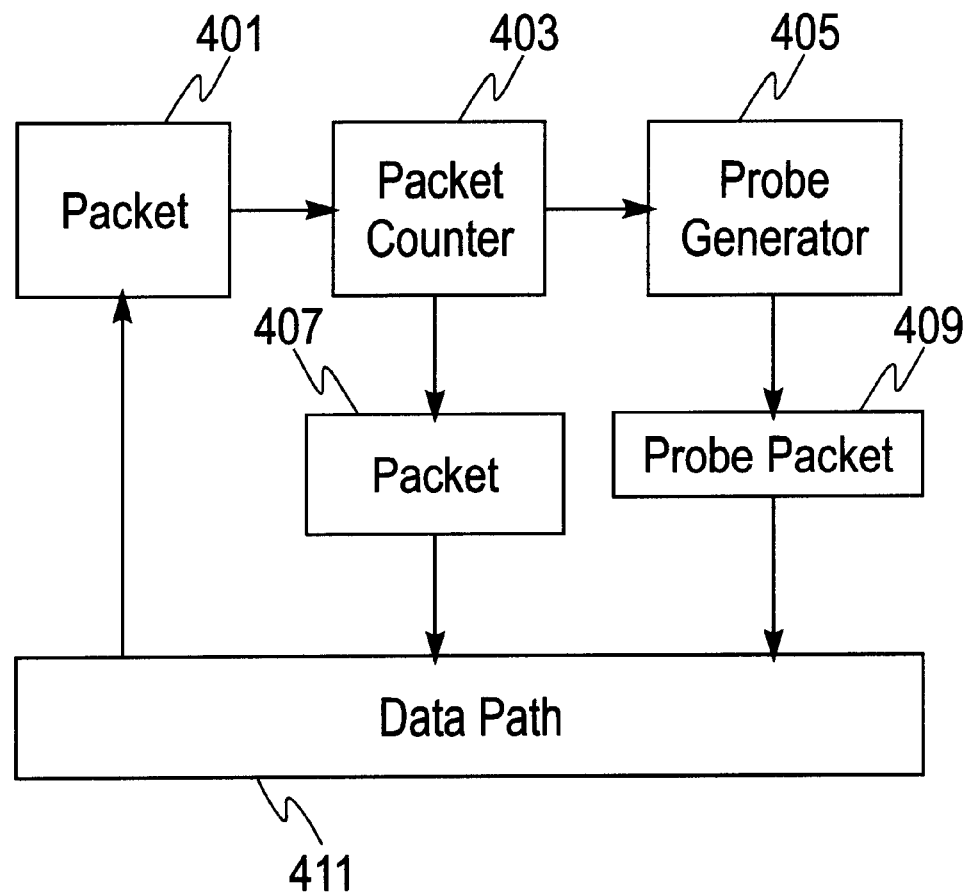
FIG. 4 shows an example block diagram that illustrates the components and the relationships between them for a process of sending probe packets for bandwidth statistics in accordance with the present invention.

FIG. 4 shows an example of system components for sending probe packets. It includes the packets 401, a packet counter 403, a probe generator 405, a standard packet 407, and a probe packet 409 going to the data path 411.

Figure 5:
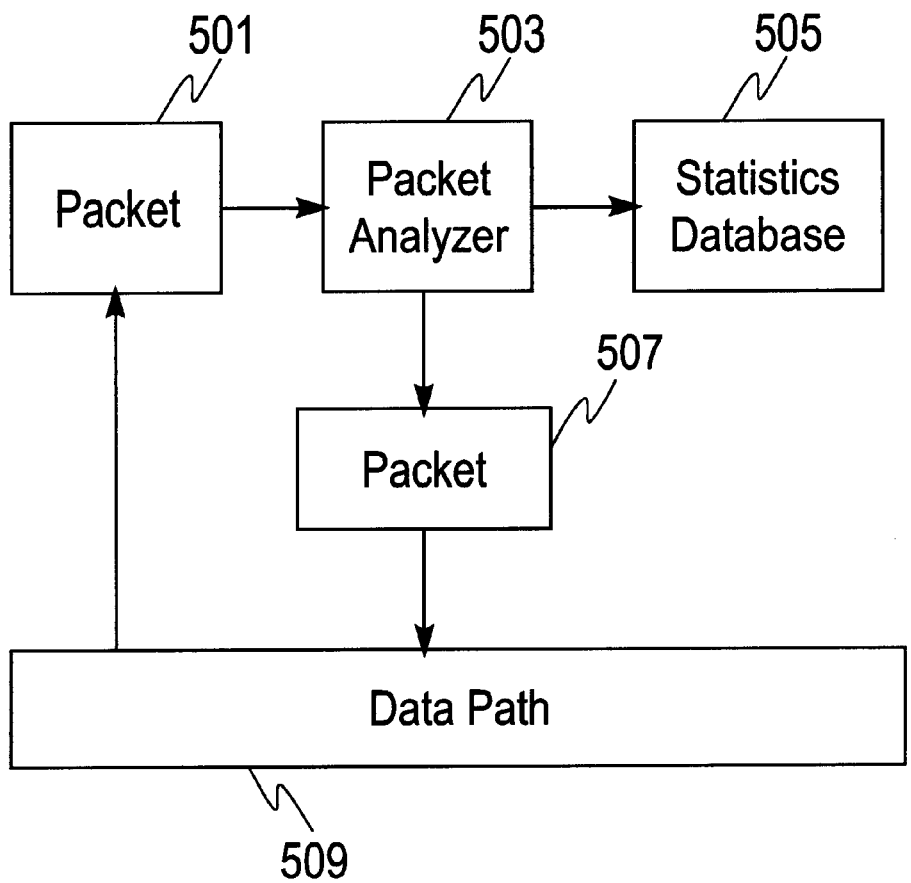
FIG. 5 shows an example block diagram that illustrates the components and the relationships between them for the purpose of receiving probe packets for statistical bandwidth data gathering in accordance with the present invention.

FIG. 5 shows an example of system components for receiving packets. It includes the packet as received 501, a packet analyzer 503, a statistics database 505, and the processed packet 507 feeding the data path 509.

While there are multiple ways to create probe packets, we present a scheme, which can be implemented relatively easily on most platforms. In this scheme, the probe packets are created with an IP header and a UDP header. However, the protocol field in the IP header is not marked with the UDP protocol ID, but rather it is marked with a special reserved protocol number. The source port field in the UDP header is filled with a reserved special pattern, and the destination port field is filled with a number that is unlikely to be used at any receiving end-host. This will cause this packet to be discarded through normal IP mechanisms at its destination if an egress edge device is not encountered by the probe packet. This reserved protocol number is used by the egress access router to identify probe packets in order to extract them from the stream. It then matches the reserved special pattern in the source and destination port fields to double-check the probe packet. It replaces the protocol field with the UDP protocol number and the destination port is replaced with a local port number where a monitoring process is active. This allows the egress access router to handle the packet as a normal UDP packet.

A performance monitoring protocol is used in order to monitor the performance of the network. In an example of a performance monitoring protocol the UDP payload of the probe packet is used to carry information about network delays. The source access router includes the time-stamp of the creation in the probe packet. It sometimes also contains an optional indication for the destination access router to reflect the packet back to the source. Example flow diagrams of the steps to implement a typical protocol are given following the description of the protocol.

In this performance monitoring protocol, when the packet is received at the egress access router, the local time-stamp of packet reception is computed. The difference in time between the packet reception and transmission is the delay. This difference is rounded to zero if it happens to be negative. The time difference is smoothed out using a running average, and compared to a target delay stored in a configuration file, or in a directory database. If the smoothed delay exceeds a target delay, or in some cases when it approaches it, a trigger is generated for the ingress and egress access routers to activate the heavy weight performance monitoring protocol available on them. This scheme works well when the target delay amounts exceed the amount of clock skew that is expected among the two routers.

In cases wherein the clock skew (a common time difference between access routers) is an issue, the ingress access router contains an option that probe packets be reflected back to it. The ingress access router then has a smoothed round-trip delay. It activates the heavy weight performance monitoring when the round-trip delay exceeds the target round-trip delays.

Note that the continuous monitoring provides a low overhead trigger that is activated when network performance problems are suspected. A more precise value of network performance is obtained by the heavy weight monitoring protocol, and an appropriate alarm generated for notifying a network operator.

For the following description refer back to FIG. 1, wherein access router-1 107 represents an ingress access router for ISP customer network-1 101, and access router-2 111 represents an egress access router for ISP customer network-2 113. Client devices 103 and 105 are part of ISP customer network-1 101 and client devices 113 and 117 are part of ISP customer network-2 113. The description assumes that data travels from ISP customer network-1 101 to ISP customer network-2 113. In this case, the access router-1 107, receives data from client devices 103 and 105 in the form of (e.g. IP) packets. The combined flows of clients 103 and 105 to access router-1 107 have a rate 'R' which is the rate measured at any given point in time. Rate 'R' may or may not be continuous. Access router-1 107 includes an event counter 'E'. This counter is incremented based on a configurable preset criteria. The preset criteria is usually the occurrence of a type of event to increment event counter 'E'. The event may be a number of packets being sent, a number of bytes being sent, time elapse, and/or a dynamically changing event. The criteria is used as a setting which indicates that counter 'E' should be incremented. In a simple embodiment, it is based on the number of packets or bytes which it receives from clients 103 and 105. It is sometimes based on an amount of time elapsed. Access router-1 107 increments this counter. When the counter reaches a predetermined value N, access router-1 107 copies the current packet received (or the next packet if the event is time driven) and then forwards the original packet as normal.

The (e.g. IP) packet that has been copied is altered and converted into a probe packet in the following manner. The source address is replaced with the source address of access router-1 107. The protocol number field is changed to a defined value not used by other protocols. The payload section of the copied packet is discarded and is replaced by a UDP header and data section. The destination and source port numbers are set to a well-known port number. The probe packet is formed to also contain additional data to be used for network monitoring. The additional data may include things such as a probe identifier, local time-stamp and reflect field. Access router-1 107 then forwards this packet onto the Internet 109.

The probe packet travels over the Internet 109 to be received by access router-2 111. Access router-2 111 recognizes this packet as a probe packet by its protocol number and/or its source port field within the packet header. Access router-2 111 replaces the protocol field with the UDP protocol number and the destination port with a local port number. The local port is where some process local to access router-2 111 receives this probe packet in the form of a UDP packet and processes it.

Access router-2 111 processes the probe packet by extracting the time-stamp included by access router-1 107 in the data section of the probe packet. The 'reflect' packet field is checked to determine if the probe packet should be reflected back to the source access router-1 107. When access router-2 111, receives the probe packet, a local time-stamp is compared to the time-stamp included in the packet. The difference between the receive time-stamp and the sent time-stamp is the delay of transmission from access router-1 107 to access router-2 111. This transmission delay is used in a running average, which is compared to a target transmission delay. If the average delay exceeds or approaches the target delay, access router-2 111 will start a heavy weight performance monitoring protocol between access router-1 107 and access router-2 111. The heavy weight performance monitoring protocol may also be started by access router-1 107 if probe packets are being reflected back to access router-1 107 from access router-2 111 and the round trip delay exceeds a target round trip delay for access router-1 107. The results of the heavy weight monitoring mechanism are sent to the network operator.

As each probe packet is being received by access router-2 111, access router-2 111 keeps track of how many probe packets it has received from each source access router. Using the number of probe packets received, access router-2 111 can estimate how many packets it expects to receive from the source, access router-1 107. The estimated bandwidth can be sent to the network operator.

Figure 6:
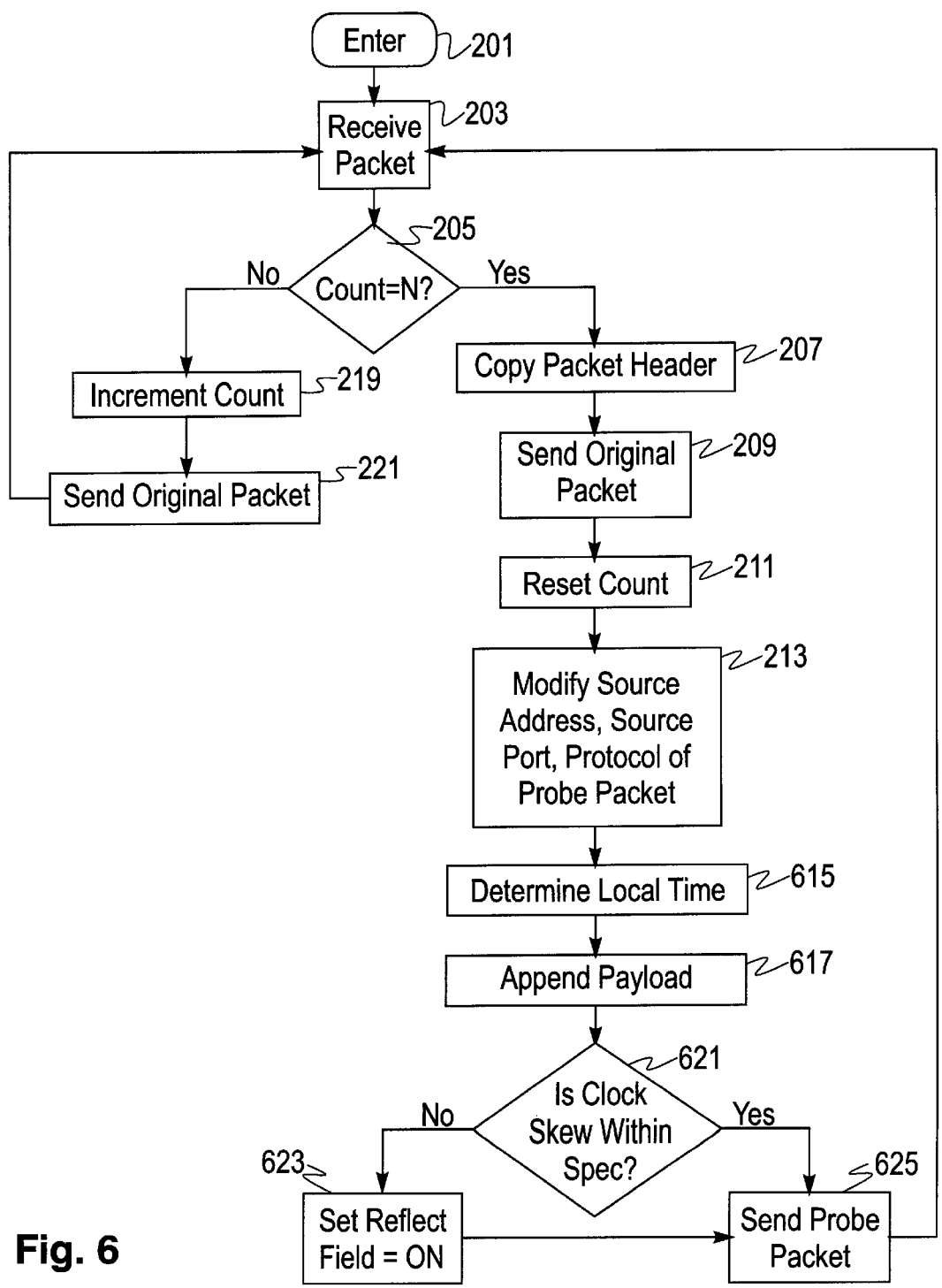
FIG. 6 shows an example flow diagram that illustrates the steps taken when sending a probe packet for delay and performance monitoring in accordance with the present invention.

FIG. 6 shows an example of a flow diagram for the transmission of the probe packets for delay and performance monitoring. In this case, before the probe packet is sent out, the clock skew is checked 621 whether it is within the specified value. If it is, the probe packet is sent out 625. If it is not, the 'reflect' field of the probe packet is set to 'ON' 623, before the probe packet is sent out 625.

Figure 7:
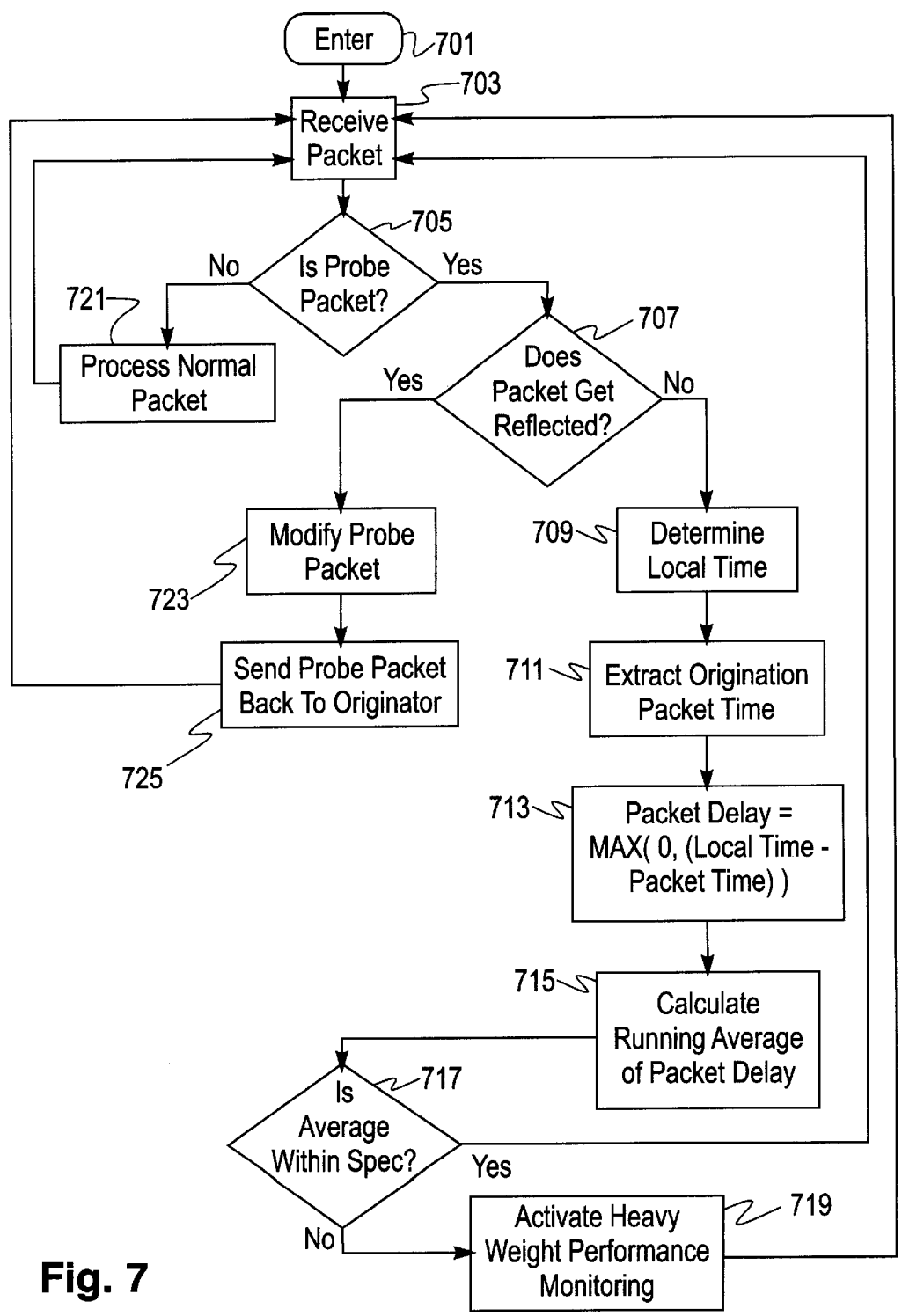
FIG. 7 shows an example flow diagram that illustrates the steps taken when receiving a probe packet for delay and performance monitoring in accordance with the present invention.

FIG. 7 shows an example of a flow diagram for the reception of the probe packets for the delay and performance monitoring. When a packet is received on an egress access router 703, it is checked to see if it is a probe packet 705. If it is not, the normal processing of the packet is performed 721. If the packet is a probe packet, the reflect field is checked to determine if the packet gets reflected 707. If the reflect field is set, then the probe packet is modified 723 and sent back to the originator 725. If the field is not set the local time is determined 709 and the origination packet time is extracted 711. The packet delay is calculated by subtracting the origination transmission time of the packet from the current local time and taking the maximum value of the difference and zero 713, thereby rounding to zero if the difference is negative. Then, a running average delay is calculated 715. If this average is within the delay specified by the network operator, then no action is taken. If the average delay is not within the specified delay, a heavy weight performance monitoring process is activated 719.

Figure 8:
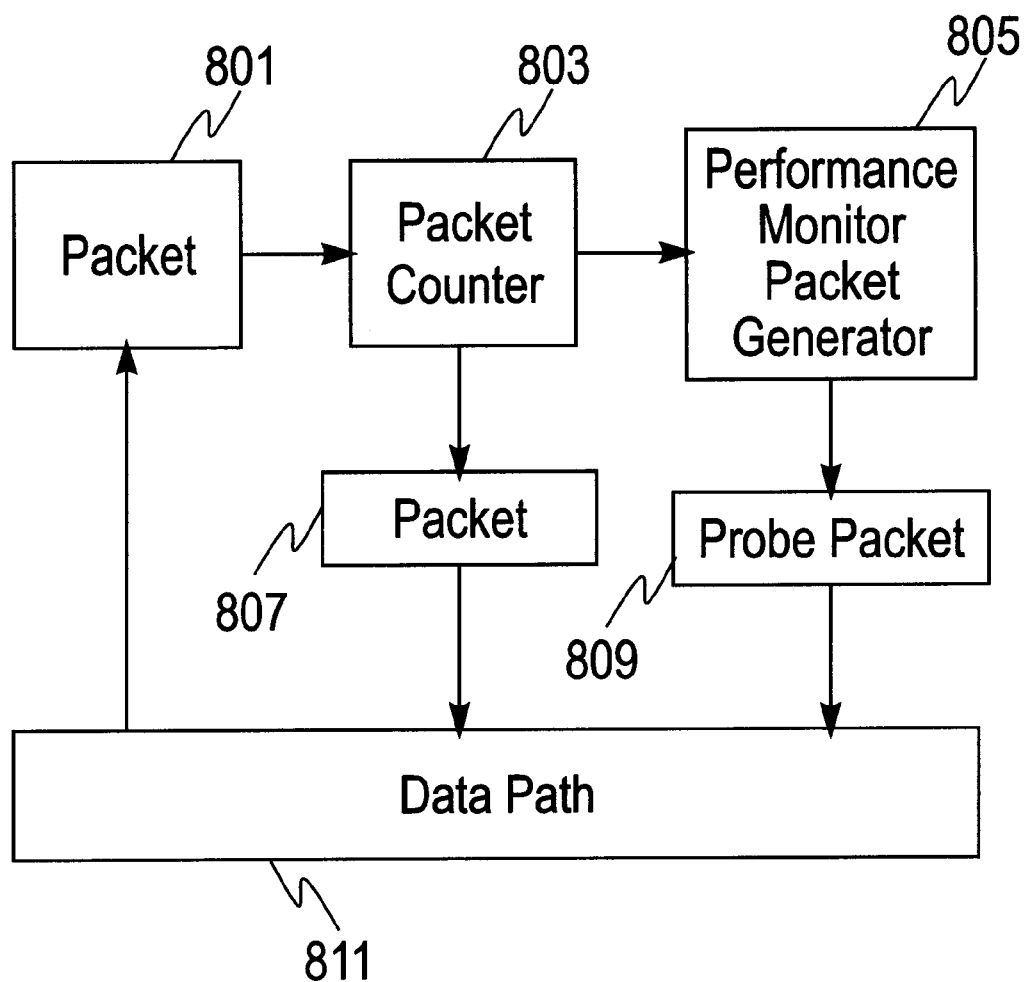
FIG. 8 shows an example block diagram that illustrates the components and the relationships between them for the process of sending probe packets for delay and performance monitoring in accordance with the present invention.
Figure 9:
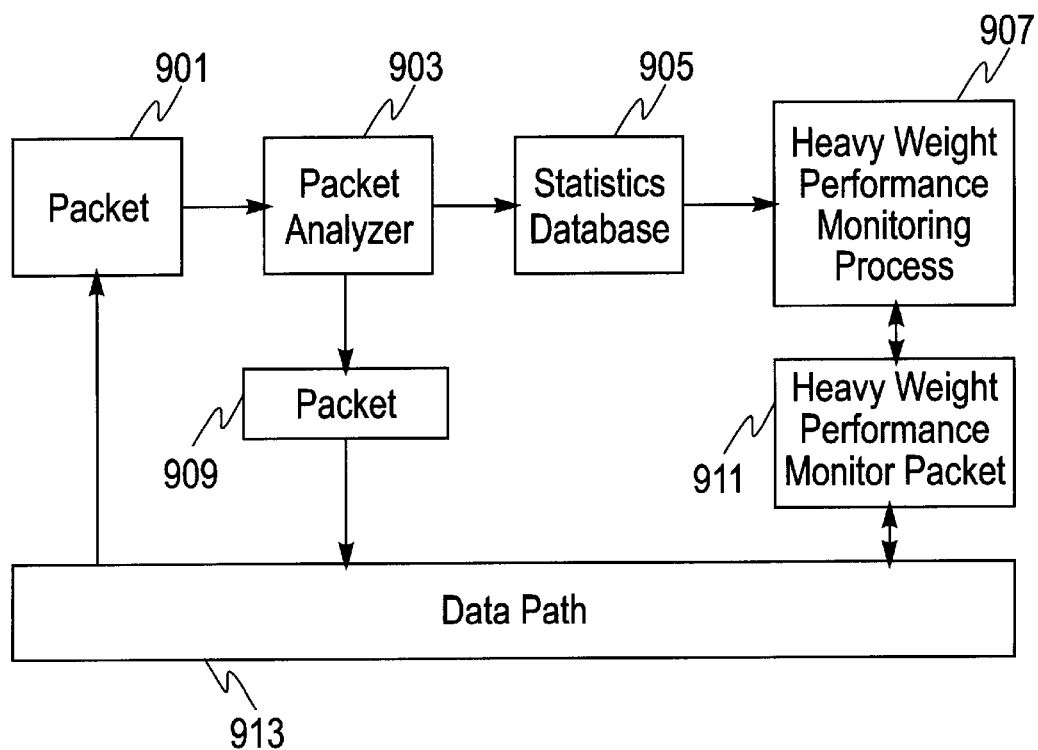
FIG. 9 shows an example block diagram that illustrates the components and the relationships between them for the process of receiving probe packets for delay and performance monitoring in accordance with the present invention.

The system components for the sending and receiving of the probe packets for the delay and performance monitoring are shown in FIGS. 8 and 9 respectively. FIG. 8 shows the packet as sent 801, going to a packet counter 803, and then to a performance monitor packet generator 805. The probe packet 809 and original packet 807 are put on the data path 811.

FIG. 9 shows the packets that are received 901, and analyzed 903. Normal (non-probe) packets pass through the packet analyzer 903, forming packet 909, which is fed onto the data path 913. The results of the probe packets analysis go to a statistics database 905. When the statistics indicate that a heavy weight process is needed, the heavy weight performance monitoring process 907 is initiated. The heavy weight performance monitoring process 907 forms a set of performance monitor packets 911. The performance monitor packets 911 are fed onto the data path 913. The format and quantity of the performance monitor packets 911 are dependent upon the protocol used within the heavy weight performance monitoring process in ways known to those skilled in the art. These ways are outside the scope of this invention.

The probe packet also serves the purpose of fault monitoring. It is noted that access router-2 111 has a smoothed average of the number of packets it has received from access router-1 107. When the smoothed expected number is significantly more than the actual number of packets received, a heavy weight fault detection protocol is activated. This may be, for example, by running ping between access router-1 107 and access router-2 111. The results of the heavy weight fault detection mechanism are sent to the network operator.

Figure 10:
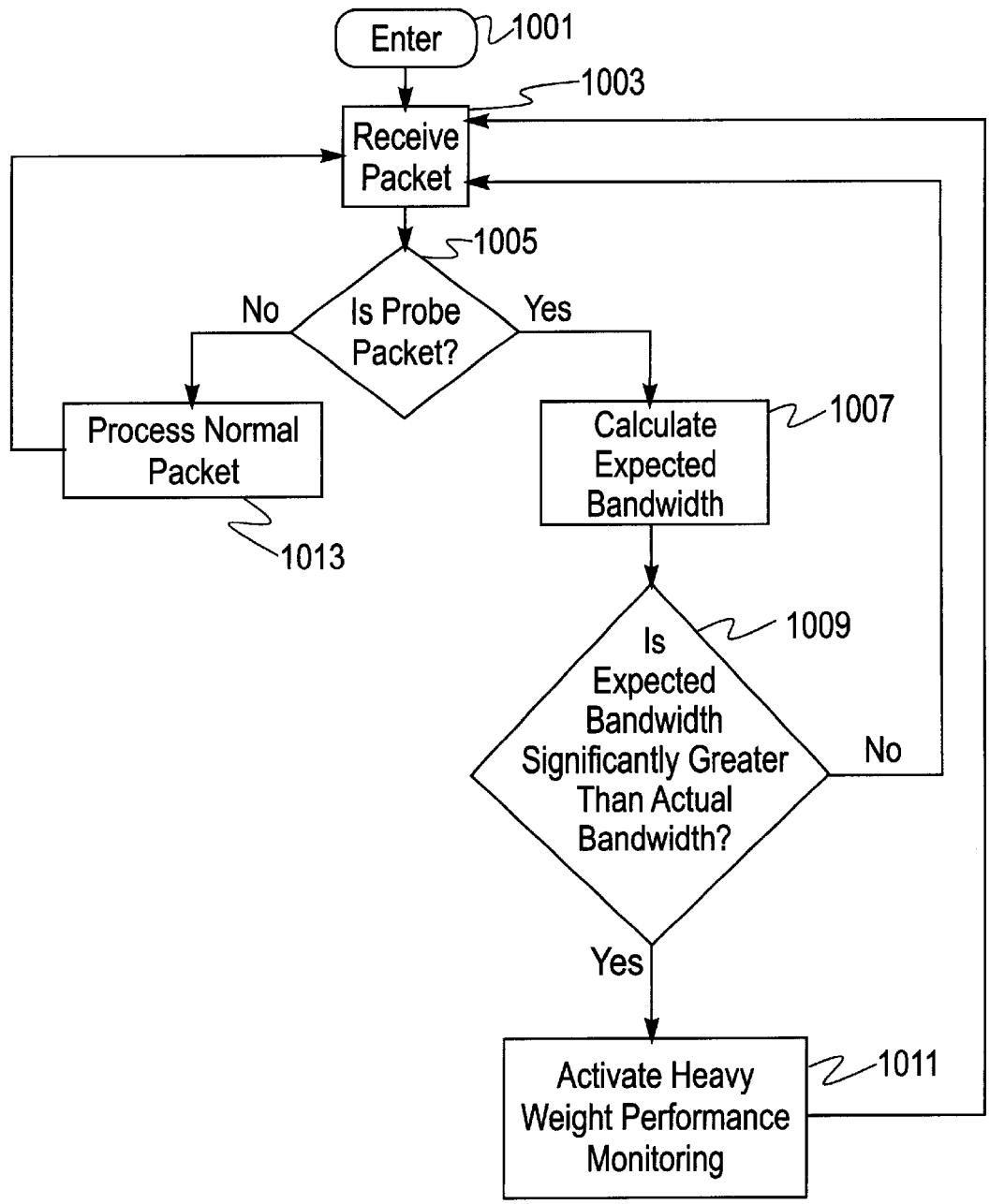
FIG. 10 shows an example flow diagram that illustrates the steps taken when receiving a probe packet for fault monitoring in accordance with the present invention.

FIG. 10 shows an example of a flow diagram for fault monitoring when receiving the probe packets on the egress access routers. When a packet is received 1003, it is checked to see if it is a probe packet 1005. If the received packet is not a probe packet, then the normal processing of the packet is performed 1013. On the other hand, if the received packet is a probe packet, the expected bandwidth is calculated 1007. If the expected bandwidth is greater than the actual bandwidth, a heavy weight fault detection process is performed 1011. If it is not greater than the actual bandwidth, no action is taken and the flow is returned to receive another packet 1003.

Figure 11:
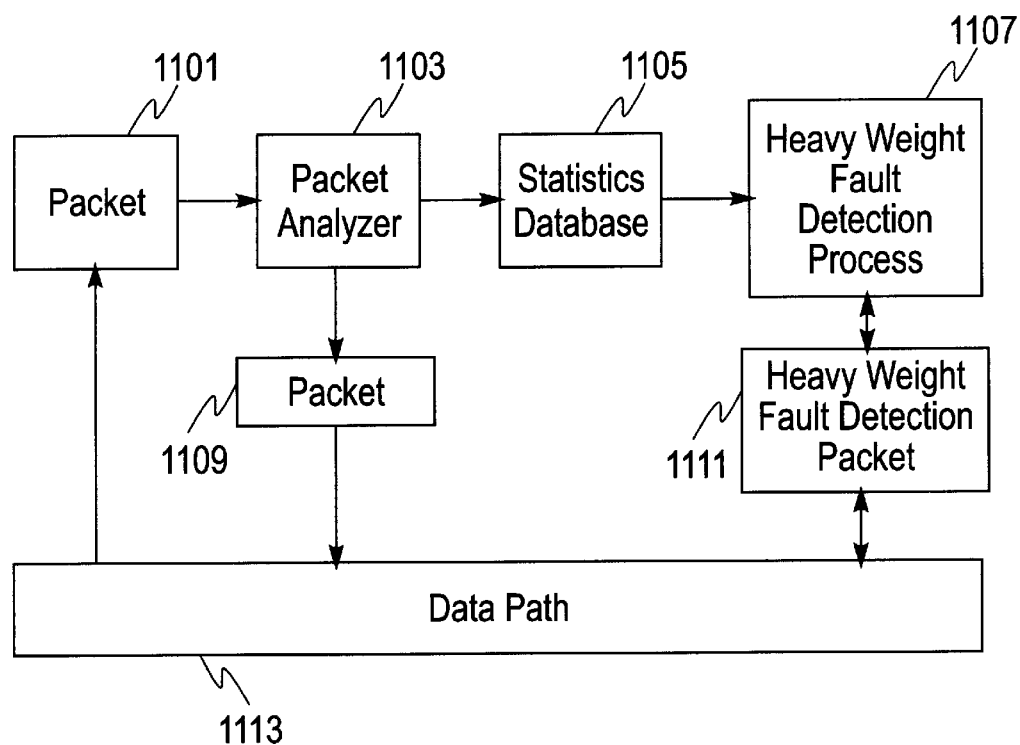
FIG. 11 shows an example block diagram that illustrates the components for receiving a fault monitoring probe packet in accordance with the present invention.

The system components for the reception of the probe packets for fault monitoring are shown in FIG. 11. Normal packets pass through the packet analyzer 1103. The analyzer sends normal (non-probe) packets 1109 back onto the data path 1113. Probe packets are analyzed by the packet analyzer which then forwards the probe packet information to the statistics database 1105. When the database results indicate that a heavy weight fault detection process is needed, the heavy weight fault detection process 1107 is initiated. The heavy weight fault detection process 1107 forms a set of fault detection packets 1111 which are fed onto the data path 1113. The format and quantity of the fault detection packets 1111 are dependent upon the protocol used within the heavy weight fault detection process, in ways known to those skilled in the art. These ways are outside the scope of this invention.

The system components for the reception of the probe packets for fault monitoring are shown in FIG. 11. It shows the received packets 1101, feeding a packet analyzer 1103. The analyzer sends the packet 1109 for forwarding on the data path 1113 and also to the statistics database 1105. When the database results indicate that a heavy weight fault detection process is needed, the heavy weight fault detection process 1107 is initiated. The heavy weight fault detection process 1107 forms a performance monitor packet 1111. The performance monitor packet 1111 is fed onto the data path 1113.

Figures 12A, 12B:
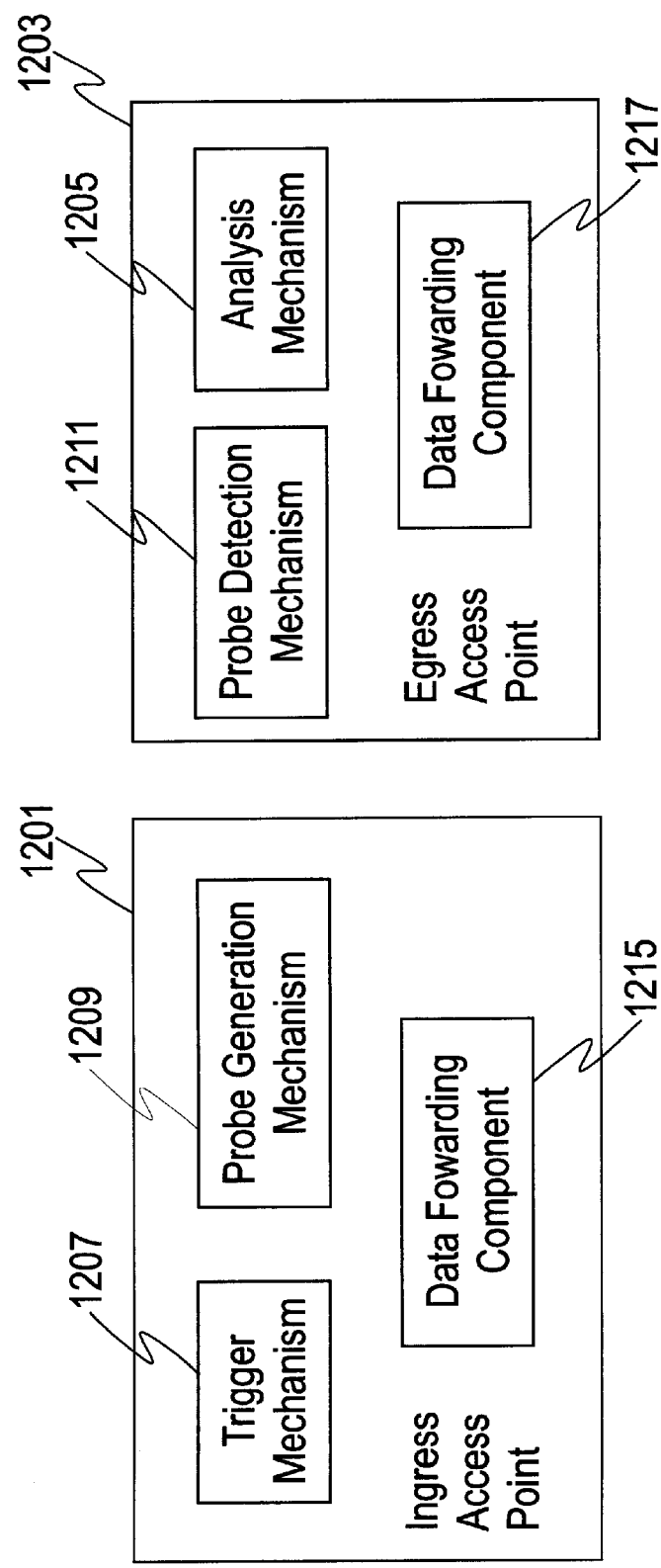
FIG. 12 shows an example of the components used for a system to perform the low overhead continuous monitoring in accordance with the present invention.

FIG. 12 shows an example of the components used for a system to perform the low overhead continuous monitoring described in this application. It shows a way in which an apparatus required for the low overhead continuous monitoring of network performance can be constructed. The apparatus consists of components at each of the two access points of the network. The apparatus 1201 is at the ingress access point and the apparatus 1203 is at the egress access point of the network. The analysis component 1205 is used to analyze probe packets and to determine the final bandwidth performance value. Although the analysis component 1205 is shown to be located at the egress apparatus 1203, it can be located at either the ingress or the egress access point, or at another machine in the network.

At the ingress access point, the apparatus 1201 includes a trigger mechanism 1207 and a probe generation mechanism 1209. These components are in addition to the data forwarding component 1215 which is present in any access point. The trigger mechanism 1207 determines when to generate a probe packet. This decision could be made when specific time-intervals elapse, on a count of packets or bytes processed by the data forwarding component 1215. When the trigger mechanism determines that a probe is to be generated, it activates the probe generation component 1209 which creates a probe packet. The probe packet is created from the contents of the current or the next data packet being processed by the access point.

At the egress point, the apparatus 1203 includes a probe detection mechanism 1211, an analysis mechanism 1205, and the data forwarding component 1217 which is present in any access points. The probe detection mechanism 1211 determines when the probe packets have been received at the egress access point. It maintains statistics about the probe packets received, and processes them according to the method described in FIG. 3. The analysis mechanism 1205 is responsible for collecting information about probe packets sent by the ingress access point 1201, the probe packets received by the egress access point 1203 and computing the final statistics about the network performance.

In some embodiments the place to generate probe packets and to detect them is in the packet forwarding loop at the ingress and/or egress access points. Those skilled in the art realize that the same method can be used without modifying the packet forwarding loop at the access points. It can be achieved by deploying the same method in a snooper box which is capable of monitoring all the packets that traverse the forwarding path of an access point. The snooper box at the ingress access point can generate probe-packets at specific triggers (e.g. packet counts, byte counts, etc.) to a specific destination. The snooper-box at the egress access point can detect the probe packets due to their structure. The snooper-box can not remove the probe packets from the data-stream, but can perform all other steps of the method outlined above, including reflecting a copy of the probe packet to the originating ingress access point.

In an embodiment, the network overhead of the probe packets is constrained to be only a limited percentage of the total network load. This is done for example by choosing the configurable count number N to be dynamically varied to be a predetermined percentage of the actual number of packets or bytes sent.

It is noted that the network monitoring scheme described in this invention also reduces the extra load normally added to the network to implement monitoring. This is because the scheme only measures the traffic between access points that have traffic running. Other methods make measurements between all the access points, without consideration of the existence of traffic through them. The continuous monitoring used in an embodiment of the present invention detects any problems in the network while a heavy weight monitoring protocol calculates a more precise value of the network performance when necessary.

There are many ways to implement the present invention. This includes as an article of manufacture including a computer readable medium and/or a computer product which enables and/or directs the implementation of the method and/or system described.

It is noted that this invention may be used for many applications. Although the description is made for particular arrangements and applications, primarily in regard to networks based on the TCP/IP, and for ISPs, the intent and concept of the invention is suitable and applicable to other networks, protocols, services, providers, arrangements and/or applications. It will be clear to those skilled in the art that other modifications to the disclosed embodiments can be effected without departing from the spirit and scope of the invention.

What is claimed is:

1. A method for determining network characteristics between a first and a second access point in a network, the method comprising:

configuring the first access point as an ingress access point to generate a plurality of probe packets;

generating each of the probe packets based on contents of a data packet and on preset criteria;

configuring the second access point as an egress access point to detect the probe packets; and correlating each of the probe packets received at the egress access point with one of the probe packets sent by the ingress access point to determine the network characteristics between the two access points.

2. A method as recited in claim 1, wherein the preset criteria is such that a probe packet is generated after a specific number of data packets have passed through the first ingress access point.

3. A method as recited in claim 1, wherein the preset criteria is such that a probe packet is generated after a specific time interval has elapsed at the first ingress access point.

4. A method as recited in claim 1, wherein the preset criteria is such that the probe packets are generated after a specific number of bytes have passed through the first ingress access point.

5. A method as recited in claim 1, wherein the network characteristics include network bandwidth, and the step of correlating includes the step of comparing a count of probe packets sent by the ingress access point to a count of probe packets received by the egress access point.

6. A method as recited in claim 1, wherein the egress access router removes the probe packets from normal data traffic when each of the probe packets is detected.

7. A method as recited in claim 1, wherein the probe packets are structured so that they are discarded through normal network mechanisms if an egress edge device is not found at the specified destination address of the probe packet.

8. A method as recited in claim 1, wherein the step of generating includes the step of copying;

the destination field in a packet header of the probe packet from the destination field in a data packet passing through the ingress access point; and setting fields in the probe packet header or payload to specific values which enable the egress access point to detect the probe packet.

9. A method as recited in claim 8, wherein the protocol number in the pocket header is changed to a special reserved protocol number.

10. A method as recited in claim 8, wherein the network is an IP network and an UDP payload is put into the probe packet with a reserved pattern and attaching a data segment as the UDP payload which includes a probe number and local time-stamp.

11. A method recited in claim 1, wherein the network characteristics include network delay and the step of correlating includes, comparing the time difference between the time when the probe-packet is generated at the ingress access point and the time the probe packet is received at the egress access point to give the network delay.

12. A method as recited in claim 10, further comprising the step of the ingress access point placing a time-stamp in the UDP payload of the probe packet.

13. A method as recited in claim 1, further comprising the step of the egress access point determining an expected number of probe packets to be obtained from a particular ingress access point on a basis of probe packets being received from the particular ingress access point.

14. A method as recited in claim 1, wherein the network characteristics include a round-trip delay between two end-points and the step of generating includes marking the probe packet with a time of generation, the method further comprising;

the egress access point reflecting a probe packet back to the ingress access point; and the ingress access point comparing the time of generation to a time when the probe was received back.

15. A method as recited in claims 13, further comprising the step of determining network faults by comparing the expected number of probe packets at a particular egress access point to a number of probe packets actually received at the particular egress access point.

16. A method as recited in claim 1, wherein the network is an IP network.

17. A method as recited in claim 1, wherein the ingress point is located at a campus firewall.

18. A method as recited in claim 1, wherein the ingress and egress points are each located in separate routers.

19. An apparatus to monitor network performance characteristic between a first and a second access point in the network, said apparatus comprising:
    a trigger mechanism at the first access point for determining a time to generate a probe packet;
    a probe generation mechanism at the first access point for generating a probe packet based on contents of a data packet and probe generating criteria;
    a probe detection mechanism at the second access point for detecting the probe packet; and
    an analysis mechanism to compare the probe packet detected at the second access point to the probe packet generated at the first access point.

20. An apparatus as described in claim 19, wherein the trigger mechanism and probe generation mechanism are located in a path of forwarding packets.

21. An apparatus as described in claim 19, wherein the probe detection mechanism is located in the path of forwarding packets.

22. An apparatus as described in claim 21, wherein the probe detection mechanism performs the additional function of removing probe packets from a data stream.

23. An apparatus as described in claim 19, wherein the trigger mechanism and probe generation mechanism are located outside of the data forwarding path of the packets, and monitor the flow of packets through the first access point.

24. An apparatus as described in claim 19, wherein the probe detection mechanism is located outside of the data forwarding path of packets, and operates by monitoring the flow of packets through the second access point.

25. A method comprising:
    providing bandwidth measurement between an ingress and an egress access router in a network by:
        counting a plurality of packets at the ingress access-router;
        generating a probe packet based on content of a data packet whenever a packet count reaches a specified value N; and
        counting the probe packets received at the egress access-router.

26. A method as recited in claim 25, further comprising the step of discarding the probe packets through normal network mechanisms if an egress edge device is not found at a specified destination address of the probe packet.

27. A method as recited in claim 25, wherein the step of generating includes probe packets copying every Nth packet and changing the source address of the Nth packet to that of an originating access router; changing the protocol number to a reserved protocol number; attaching a UDP header with a reserved pattern; and attaching a data segment as the UDP payload which includes a probe number and a local time-stamp.

28. The method of claim 27, further comprising the step of the egress access-router identifying probe packets by the reserved protocol number and the UDP header pattern.

29. A method as recited in claim 25, wherein a delay between two endpoints can be determined through use of a common clock and probe packets.

30. The method as recited in claim 25, further comprising the step of counting a first number of probe packets received, and comparing the first number to a second number of packets that should have been received.

31. The method of claim 25, further comprising the step of determining a delay between two endpoints in the network by reflecting a probe packet back to a source router, and determining the round-trip time between the access routers.

32. The method of claim 25, further comprising the step of determining network faults by keeping a count of a number of probe packets received over a time interval.

33. A method for providing bandwidth accounting between a first and a second ISP access point in a network, the method comprising:
    configuring at least one ingress access point to have a first packet count of 'N-in';
    said at least one ingress access point keeping track of a second packet count 'N-out' of packets sent into the network; and
    generating a probe packet whenever 'N-out'='N-in', wherein said probe packets being given a destination address of an Nth packet sent into the network, and being given a source address of an ingress router associated with the at least one ingress point.

34. A method as recited in claim 33, further comprising:
    identifying and removing the probe packet from a network data stream and an egress router associated with the at least one ingress point;
    sending the probe packet to a local processor;
    analyzing the probe packet at the local processor; and
    incrementing a packet count of packets received from the ingress access router.

35. The method of claim 34, further comprising the step of converting the packet count into an estimate of packets sent by the ingress access router.

36. The method as recited in claim 33, further comprising the step of discarding the probe packets that do not encounter an egress access router.

37. The method as recited in claim 33, further comprising the step of adjusting the probe packet according to a change in network statistics.

38. A method for forming a plurality of probes packets in a network, said method comprising:
    marking of protocol field in a header of each probe packet with a reserved protocol number;
    filling a source port field in a UDP header for each probe packet with the reserved pattern; and
    filling a destination probe field with the probe number.

39. A method as recited in claim 38, further comprising the step of using the reserved protocol number at an egress access router to identify each probe packet.

40. The method as recited in claim 39, further comprising the step of extracting each probe packet based on an identification obtained in the step of using.

41. A method comprising:
    monitoring performance of a shared network by:
        forming a probe packet for each group of packets based on content of a data packet received by a router on the network;
        counting the probe packets; and
        estimating the network bandwidth based on the packet probe count compared to a preset criteria.

42. A method for measuring network characteristics between a first and a second router in a network, the method comprising:

configuring at least one ingress access point on the first router to generate a plurality of probe packets;

generating each of the probe packets based on the contents of a next data packet passing through the ingress access point;

configuring at least one egress access point on the second router to detect the probe packet; and correlating each of the probe packets received at the egress access point with each of the probe packets sent by the ingress access point to determine the network characteristics between the ingress and egress access points.

43. A method as recited in claim 42, wherein the probe packets are generated after a preset number of data packets have passed through the ingress access point.

44. A method as recited in claim 42, wherein the network characteristics being measured include network bandwidth, and the step of correlating includes comparing a count of probe packets sent by the first router to the count of probe packets received by the second router.

45. A method as recited in claim 42, wherein the egress access router removes each of the probe packets from normal data traffic after each of the probe packets is detected.

46. A method as recited in claim 42, wherein the probe packets are structured so that they are discarded through normal network mechanisms.

47. A method as recited in claim 42, wherein the step of generating includes forming each of the probe packets as follows:

copying a destination field in a particular data packet passing through the ingress access point to a probe destination field in the header of the probe packet;

forming a probe source address in the header of the probe packet to be a router source address of an originating access router; and setting fields in the header or payload of the probe packet to be a specific value which enables the egress access point to detect the probe packet.

48. A method as recited in claim 47, wherein the protocol number in the header is changed to a special reserved protocol number.

49. A method as recited in claim 47, wherein an UDP payload is put in the probe packet with a reserved pattern and attaching a data segment as the UDP payload which includes such information as the probe number and local time-stamp.

50. An article of manufacture comprising a computer usable medium having computer readable program code means embodied therein for determining network characteristics between a first and a second access point in a network, the computer readable program code means in said article of manufacture comprising computer readable program code means for causing a computer to effect:

configuring the first access point as an ingress access point to generate a plurality of probe packets;

generating each of the probe packets based on contents of a data packet and preset criteria;

configuring the second access point as an egress access point to detect the probe packets; and correlating each of the probe packets received at the egress access point with one of the probe packets sent by the ingress access point to determine the network characteristics between the two access points.

51. An article of manufacture as recited in claim 50, wherein the network characteristics include a round-trip delay between two endpoints and the step of generating includes marking the probe packet with a time of generation, and the computer readable program code means in said article of manufacture further comprising computer readable program code means for causing a computer to effect:

the egress access point reflecting a probe packet back to the ingress access point; and the ingress access point comparing the time of generation to a time when the probe was received back.

52. An article of manufacture as recited in claim 50, the computer readable program code means in said article of manufacture further comprising computer readable program code means for causing a computer to effect the step of the egress access point determining an expected number of probe packets to be obtained from a particular ingress access point on a basis of probe packets being received from the particular ingress access point.

53. A computer program product comprising a computer usable medium having computer readable program code means embodied therein for providing bandwidth measurement between an ingress and an egress access router in a network, the computer readable program code means in said computer program product comprising computer readable program code means for causing a computer to effect:

counting a plurality of packets at the ingress access-router;

generating a probe packet whenever a packet count reaches a specified value N; and counting the probe packets received at the egress access-router.

54. A computer program product as recited in claim 53, the computer readable program code means in said computer program product further comprising computer readable program code means for causing a computer to effect discarding the probe packets through normal network mechanisms if an egress edge device is not found at a specified destination address of the probe packet.

55. A computer program product as recited in claim 53, wherein the step of generating includes probe packets being generated by copying every Nth packet and changing the source address of the Nth packet to that of an originating access router; changing the protocol number to a reserved protocol number; attaching a UDP header with a reserved pattern; and attaching a data segment as the UDP payload which includes a probe number and a local time-stamp.

56. A program storage device readable by machine, tangibly embodying a program of instructions executable by the machine to perform method steps for providing bandwidth accounting between a first and a second ISP access point in a network, said method steps comprising:

configuring at least one ingress access point to have a first packet count of 'N-in';

said at least one ingress access point keeping track of a second packet count 'N-out' of packets sent into the network; and generating a probe packet when 'N-out'='N-in', wherein said probe packets being given a destination address of an Nth packet sent into the network, and being given a source address of an ingress router associated with the at least one ingress point.

57. A program storage device readable by machine as recited in claim 56, said method steps further comprising:

identifying and removing the probe packet from a network data stream and an egress router associated with the at least one ingress point;

sending the probe packet to a local processor;

analyzing the probe packet at the local processor; and incrementing a packet count of packets received from the ingress access router.

58. A program storage device readable by machine as recited in claim 57, said method steps further comprising the step of converting the packet count into an estimate of packets sent by the ingress access router.

59. An article of manufacture comprising a computer usable medium having computer readable program code means embodied therein for measuring network characteristics between a first and a second router in a network, the computer readable program code means in said article of manufacture comprising computer readable program code means for causing a computer to effect:

configuring at least one ingress access point on the first router to generate a plurality of probe packets;

generating each of the probe packets based on the contents of a next data packet passing through the ingress access point;

configuring at least one egress access point on the second router to detect the probe packet; and correlating each of the probe packets received at the egress access point with each of the probe packets sent by the ingress access point to determine the network characteristics between the ingress and egress access points.

60. An article of manufacture as recited in claim 59, wherein the step of generating includes forming each of the probe packets by effecting the steps of:

copying a destination field in a particular data packet passing through the ingress access point to a probe destination field in the header of the probe packet;

forming a probe source address in the header of the probe packet to be a router source address of an originating access router; and setting fields in the header or payload of the probe packet to be a specific value which enables the egress access point to detect the probe packet.

61. An article of manufacture as recited in claim 59, wherein the network characteristics being measured include network bandwidth, and the step of correlating includes comparing a count of probe packets sent by the first router to the count of probe packets received by the second router.

62. An article of manufacture as recited in claim 59, wherein the network characteristics being measured include network bandwidth, and the step of correlating includes comparing a count of probe packets sent by the first router to the count of probe packets received by the second router.

63. An article of manufacture as recited in claim 59, wherein the egress access router removes each of the probe packets from normal data traffic after each of the probe packets is detected.

64. An article of manufacture as recited in claim 59, wherein the probe packets are structured so that they are discarded through normal mechanisms.

65. A computer program product comprising a computer usable medium having computer readable program code means embodied therein for forming a plurality of probes packets in a network, the computer readable program code means in said computer program product comprising computer readable program code means for causing a computer to effect:

marking a protocol field in an header of each probe packet with a reserved protocol number;

filling a source port field in a UDP header for each probe packet with the reserved pattern; and filling a destination probe field with the probe number.

66. A computer program product as recited in claim 65, the computer readable program code means in said computer program product further comprising the step of using the reserved protocol number at an egress access router to identify each probe packet.

67. A computer program product as recited in claim 66, the computer readable program code means in said computer program product further comprising the step of extracting each probe packet based on an identification obtained in the step of using.

68. A computer program product comprising a computer usable medium having computer readable program code means embodied therein for monitoring performance of a shared network, the computer readable program code means in said computer program product comprising computer readable program code means for causing a computer to effect:

forming a probe packet for each group of packets received by a router on the network;

counting the probe packets; and estimating the network bandwidth based on the packet probe count compared to a preset criteria.

69. A method as recited in claim 8, wherein the step of generating also includes the step of setting the source address in a probe packet header to the source address of the first access point.

70. A method comprising:

determining network characteristics between a first and a second access point in a network, by:

configuring the first access point as an ingress access point to generate a plurality of probe packets;

generating each of the probe packets based on contents of a data packet and on preset criteria;

configuring the second access point as an egress access point to detect the probe packets; and correlating each of the probe packets received at the egress access point with one of the probe packets sent by the ingress access point to determine the network characteristics between the two access points.

* * * * *